April 5, 1966 V. K. KING 3,244,217
VALVE STEM PROTECTOR
Filed Dec. 21, 1964

INVENTOR.
Virgil K. King
BY
Jennings, Carter & Thompson
Attorneys

United States Patent Office
3,244,217
Patented Apr. 5, 1966

3,244,217
VALVE STEM PROTECTOR
Virgil K. King, Midland City, Ala.
Filed Dec. 21, 1964, Ser. No. 419,964
5 Claims. (Cl. 152—427)

This invention relates to a valve stem protector and more particularly to such a protector which may be detachably connected to the rim of a vehicle, such as a tractor or the like.

A more specific object of my invention is to provide a valve stem protector which shall embody one element which is attached to the vehicle wheel and another element detachably connected to the first element in position to overlie a valve stem whereby the valve stem may be exposed for the introduction of a fluid or gas without having to remove the first element from the vehicle wheel.

Another object of my invention is to provide a valve stem protector of the character designated which shall include cooperating lock means which limits lateral movement of the parts relative to each other whereby the protector is held firmly in position over the valve stem while in use.

A further object of my invention is to provide a valve stem protector of the character designated which shall be adjustable as to length to thereby accommodate different type vehicle wheels.

A still further object of my invention is to provide a valve stem protector of the character designated which shall be simple of construction, economical of manufacture and one which may be constructed and arranged to accommodate all conventional type tractor wheels.

Heretofore in the art to which my invention relates, farmers have encountered considerable difficulties in the operation of tractors due to the fact that the valve stems are often torn out of the tubes by engagement of the valve stems with various objects. This is especially true in view of the fact that tractors are often driven over rough terrain and through wooded areas. Considerable time is lost by the farmer as a result of the damage to the valve stem since a new valve stem must be vulcanized in place. This necessitates the removal of the tire from the wheel rim, vulcanizing a new valve stem in place and then remounting the tire on the wheel. Not only does this require a considerable amount of labor in repairing the tire but the farmer must often travel considerable distances to a tire repair shop. It is not unusual for the farmer to travel from 50 to 60 miles to the nearest tire repair shop which is equipped to handle large tractor tires.

To overcome the above and other difficulties, I have provided a valve stem protector which is adapted for use on all conventional type tractor wheels by merely attaching one element of the device to the wheel by the usual lug bolt. Another element of the device is then detachably connected to the first element in position to overlie the valve stem whereby the valve stem is protected while in use. The device is thus extremely simple to mount on the tractor wheel and at the same time the valve stem may be exposed for introduction of a liquid or gas into the tire by merely removing the element which covers the valve stem.

Apparatus embodying features of my invention is illustrated in the accompanying drawing, forming a part of this application, in which.

Figure 1:
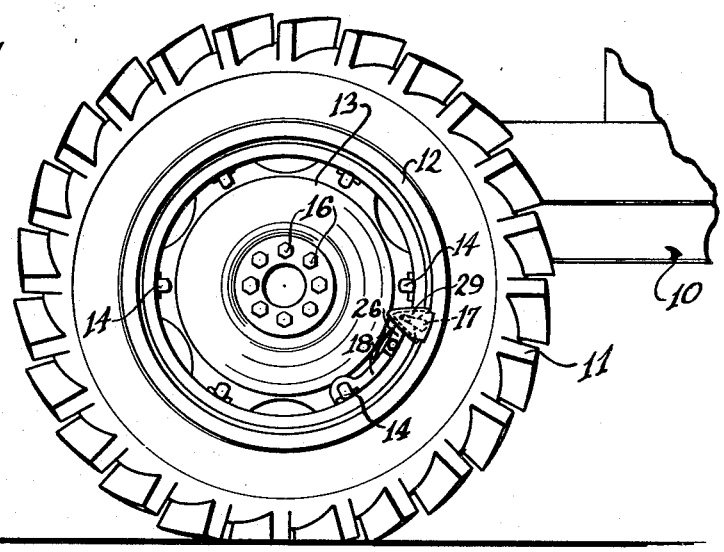
FIG. 1 is a side elevational view, partly broken away, showing a tractor wheel having my improved valve stem protector mounted thereon.

Referring now to the drawing for a better understanding of my invention, I show a fragment of a tractor 10 having wheels 11 mounted thereon. The wheel is provided with the usual rim portion 12 which in turn is connected to a disc portion 13 by lug bolts 14. The disc portion 13 is secured to the tractor axle in a manner well understood in the art by the usual lug bolts 16. The tire 10 is provided with the usual inner tube, not shown, and a valve stem 17 which projects outwardly of the rim 12, as shown in FIG. 1.

My improved valve stem protector comprises a supporting arm 18 having an opening 19 adjacent one end thereof in position to receive a lug bolt 14, as shown in FIG. 1, whereby the arm is secured to the wheel. Preferably, the opening 19 is provided with an offset slot 21 in position to cooperate with a conventional type detent carried by the lug bolt 14 whereby the arm 18 is held against rotation relative to the lug bolt. The end of the supporting arm 18 opposite the opening 19 is provided with a longitudinally extending slot 22 for receiving a retaining bolt 23 having a nut 24.

Extending alongside the end of the supporting arm 18 having the opening 22 therein is a second arm 26 which is also provided with a suitable opening therethrough for receiving the bolt 23 whereby the arms 26 and 18 are detachably connected to each other. To limit lateral or pivotal movement of the arms 18 and 26 relative to each other, a longitudinally extending rib or raised portion 27 is provided on the arm 18 in position to engage a cooperating recess 28 provided in the adjustment portion of the arm 26. The arms 18 and 26 are thus adapted to move longitudinally relative to each other and then be locked in selected positions by the retaining bolt 23 to thus vary the effective length of the arms.

Figure 2:
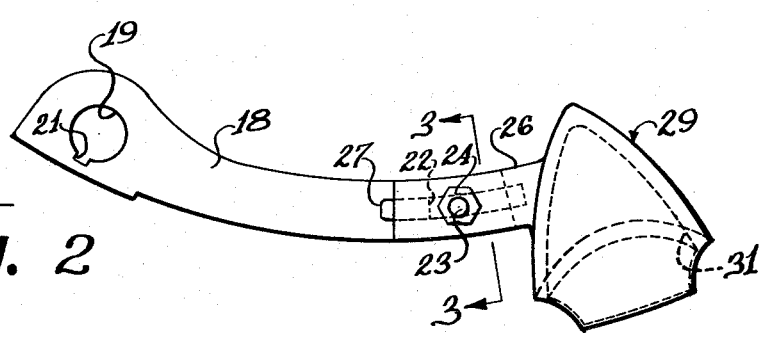
FIG. 2 is an enlarged, side elevational view showing the valve stem protector removed from the wheel.

Mounted adjacent an end of the arm 26 is a cup-shaped housing 29 which is provided with an outwardly flaring inner surface 31 adapted to surround the valve stem 17, as shown in FIG. 1. The outer surface of the housing 29 also flares outwardly toward the open end of the housing, as shown in FIG. 2, whereby the portion thereof which projects outwardly of the vehicle wheel is tapered outwardly of the wheel. By thus providing an outwardly tapered or conical surface for the housing, the housing offers a minimum of resistance to obstacles as the housing moves relative thereto. That is to say, should the housing 29 engage an obstacle, the obstacle would be deflected away from the housing, thus preventing damage to the housing and the valve stem which it covers.

From the foregoing description, the operation of my improved valve stem protector will be readily understood. The supporting arm 18 is secured to the tractor wheel by the lug bolts 14, as shown in FIG. 1, whereby it is held firmly in a fixed position. The arm 26 is then detachably connected to the arm 18 by the bolt 23 whereby the open ended housing 29 may be moved to proper position to receive the valve stem 17, as shown in FIG. 1. By providing an outwardly flaring inner surface for the housing 29, the valve stem 17 is guided inwardly of the housing and at the same time the housing may be of a minimum size. Also, the outer surface of the housing 29 is tapered outwardly of the rim 12 whereby it offers a minimum of resistance as it encounters obstacles during rotation of the wheel. With the arms 18 and 26 positioned properly relative to each other, the ridge 27 engages the longitudinally extending recess 28 whereby the arms are held against movement relative to each other. The nut 24 is then tightened on the bolt 23 whereby the housing 29 carried by the arm 26 is rigidly held in position to completely encase the valve stem 17.

To remove the housing 29 from the valve stem 17 whereby the valve stem is exposed for introducing a liquid or gas into the tire 11, the bolt 23 is removed whereupon the arm 26 and the housing may be readily separated from the arm 18. After filling the tire, the housing 29 is again inserted over the valve stem 17 and the arm 26 is again secured to the arm 18 by the bolt 23.

Figure 4:
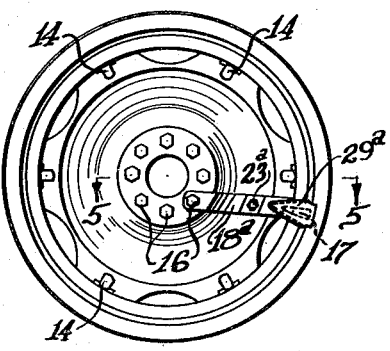
FIG. 4 is a side elevational view showing a modified form of my invention wherein the device is attached to lug bolts adjacent the center of the wheel; and, FIG. 5 is a fragmental view taken generally along the line 5—5 of FIG. 4.
Figure 5:
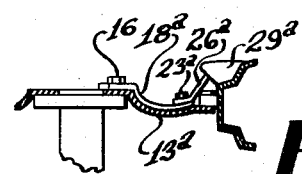

In FIGS. 4 and 5 of the drawing, I show a modified form of my invention in which a supporting arm 18ª is curved inwardly to correspond to the curvature of a disc 13ª. The supporting arm 18ª is secured to the wheel by the lug bolts 16 which are positioned adjacent the center of the wheel. A second arm 26ª is detachably connected to the adjacent end of the supporting arm 18ª by a bolt 23ª, as shown. A housing 29ª is carried by the outer end of the arm 26ª is position to telescope over a valve stem 17, as shown in FIG. 4.

Figure 3:
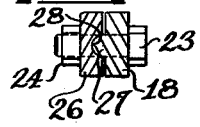
FIG. 3 is a sectional view taken generally along the line 3—3 of FIG. 2 showing the means for interlocking the elements to each other.

The arms 18ª and 26ª are provided with cooperating ridges and grooves which extend longitudinally thereof to limit lateral or pivotal movement relative to each other, as described hereinabove relative to FIGS. 1-3. Also, the inner surface of the housing 29ª flares outwardly toward the open end thereof in the same manner as the inner surface of the housing 29 flares outwardly. That is to say, the construction and operation of the apparatus shown in FIGS. 4 and 5 is substantially identical to the apparatus shown in FIGS. 1-3, the principal difference being that the arms 26ª and 18ª are of a shape and size to accommodate the wheel assembly shown in FIGS. 4 and 5 whereby the arm 18ª is secured to the lug bolts 16 adjacent the center of the wheel rather than the lug bolts 14 which connect the rim of the wheel to the disc portion 13ª.

From the foregoing, it will be seen that I have devised an improved device for protecting valve stems for vehicle wheels, such as tractors and the like. By providing one element which is secured rigidly to the wheel and then detachably connecting the open-ended housing to the first element, the housing may be readily removed from the wheel without having to remove the entire unit. Also, by adjustably connecting the second arm to the supporting arm, the position of the housing may be readily adjusted to accommodate the valve stem whereupon the arms are then locked in fixed position relative to each other. Furthermore, by providing conical inner and outer surfaces for the housing 29, the valve stem is guided into the housing to facilitate installation of the device and at the same time the outer surface of the housing offers a minimum of resistance to objects encountered by the housing, thereby preventing damage to the housing and the valve stem protected thereby.

While I have shown my invention in two forms, it will be obvious to those skilled in the art that it is not so limited, but is susceptible of various modifications and changes without departing from the spirit thereof, and I desire, therefore, that only such limitations shall be placed thereupon as are specifically set forth in the appended claims.

What I claim is:
1. In a protector for a valve stem projecting outwardly of a vehicle wheel,
   (a) a cup-shaped housing of a shape and size to telescope over and completely cover said valve stem,
   (b) a supporting arm disposed to extend alongside the wheel,
   (c) means to attach one end of said arm to the vehicle wheel, and
   (d) means detachably attaching the other end of said arm to said housing whereby said housing is removable from the valve stem and said arm without removing said arm from said wheel,
2. In a protector for a valve stem as defined in claim 1 in which the inner and outer surfaces of the housing flare outwardly toward the open end thereof.
3. In a protector for a valve stem as defined in claim 1 in which a second arm is carried by said housing, and means is provided to detachably connect said second arm to said supporting arm.
4. In a protector for a valve stem as defined in claim 3 in which said supporting arm and said second arm are held against lateral movement relative to each other by at least one cooperating groove and recess therebetween.
5. In a protector for a valve stem as defined in claim 3 in which aligned openings are provided through said other end of said supporting arm and an adjacent portion of said second arm with at least one of said openings being elongated to vary the overall effective length of the arms and a retaining member passes through said aligned openings and detachably attaches said second arm to said supporting arm.

References Cited by the Examiner
UNITED STATES PATENTS

| | | | |
|---|---|---|---|
| 2,631,065 | 3/1953 | Borodie | 152—427 X |
| 3,138,189 | 6/1964 | Minutilla | 152—21 |

FOREIGN PATENTS

| | | |
|---|---|---|
| 104,369 | 6/1938 | Australia. |

ARTHUR L. LA POINT, *Primary Examiner.*
C. W. HAEFELE, *Assistant Examiner.*